(12) United States Patent
Miyoshi et al.

(10) Patent No.: US 8,774,253 B2
(45) Date of Patent: Jul. 8, 2014

(54) WIRELESS RELAY DEVICE AND WIRELESS RELAY METHOD

(75) Inventors: Kenichi Miyoshi, Kanagawa (JP); Daichi Imamura, Kanagawa (JP); Yoshiko Saito, Kanagawa (JP)

(73) Assignee: Panasonic Corporation, Osaka (JP)

( * ) Notice: Subject to any disclaimer, the term of this patent is extended or adjusted under 35 U.S.C. 154(b) by 212 days.

(21) Appl. No.: 13/383,389

(22) PCT Filed: Jul. 27, 2010

(86) PCT No.: PCT/JP2010/004770
§ 371 (c)(1),
(2), (4) Date: Jan. 10, 2012

(87) PCT Pub. No.: WO2011/013355
PCT Pub. Date: Feb. 3, 2011

(65) Prior Publication Data
US 2012/0147930 A1 Jun. 14, 2012

(30) Foreign Application Priority Data

Jul. 28, 2009 (JP) ................................ 2009-175688

(51) Int. Cl.
*H04B 3/36* (2006.01)
(52) U.S. Cl.
USPC ........... 375/211; 375/349; 375/299; 375/267; 375/260; 375/219; 375/214; 375/316
(58) Field of Classification Search
USPC ......... 375/211, 214, 219, 260, 267, 299, 349, 375/316; 370/349, 509, 400, 315, 326, 293, 370/321
See application file for complete search history.

(56) References Cited

U.S. PATENT DOCUMENTS 8,023,445 B2 * 9/2011 Jung et al. .................... 370/315
2009/0135945 A1 5/2009 Lee
(Continued)

FOREIGN PATENT DOCUMENTS

CN 101447965 6/2009
CN 101669301 3/2010
(Continued)

OTHER PUBLICATIONS

International Search Report dated Sep. 7, 2010.
(Continued)

*Primary Examiner* — Dhaval Patel
(74) *Attorney, Agent, or Firm* — Dickinson Wright PLLC

(57) ABSTRACT

Disclosed is a wireless relay device wherein the number of stream multiplexes between a wireless transmission device and a wireless reception device can be increased without increasing the number of antennas for the wireless transmission device or the number of antennas for the wireless reception device. Specifically disclosed is a wireless relay device (100) for relaying and transmitting a signal between a wireless transmission device and a wireless reception device, which has Nrelay number (Nrelay is a natural number of 2 or more) of antenna ports, wherein a diversity reception unit (106) diversity-receives the signal which is transmitted from the wireless transmission device, and which has been modulated by the modulation multi-value number of M (where M=Nrelay 2) via the Nrelay number of antenna ports, a stream generating unit (112) divides the signal so as to generate Nrelay pieces of streams, modulation units ((114-1) to (114-Nrelay)) QPSK-modulate the Nrelay pieces of streams, and transmission RF units ((115-1) to (115-Nrelay)) transmit the N pieces of streams after modulation to the wireless reception device via the Nrelay number of antenna ports.

13 Claims, 8 Drawing Sheets

(56) References Cited

U.S. PATENT DOCUMENTS

| | | |
|---|---|---|
| 2010/0135177 A1 | 6/2010 | Liu |
| 2010/0260240 A1* | 10/2010 | Wang .................. 375/214 |
| 2011/0110284 A1 | 5/2011 | Wu |

FOREIGN PATENT DOCUMENTS

| | | | | |
|---|---|---|---|---|
| CN | 101843008 | | 9/2010 | |
| EP | 2 207 274 | | 7/2010 | |
| JP | 2006-50190 | | 2/2006 | |
| JP | WO2006/098273 | * | 9/2006 | ............ H04L 1/00 |
| JP | 2009-49937 | | 3/2009 | |
| JP | 2009-60585 | | 3/2009 | |
| JP | 2010-527185 | | 8/2010 | |
| WO | 2008/138164 | | 11/2008 | |
| WO | 2009/057183 | | 5/2009 | |

OTHER PUBLICATIONS

G.J. Foschini, et al., "On Limits of Wireless Communications in a Fading Environment when Using Multiple Antennas," Wireless Personal Communications, 1998, pp. 311-335, p. 3, Line 8.

F. Adachi, et al., "Study on MIMO Channel Capacity in a Frequency-selective Channel," Mar. 18-21, 2008, pp. S-7-S-8, with English translation, p. 3, Line 12.

* cited by examiner

WIRELESS RELAY DEVICE AND WIRELESS RELAY METHOD

TECHNICAL FIELD

The present invention relates to a radio relay apparatus and a radio relay method.

BACKGROUND ART

In recent years, a multiple-input multiple-output (MIMO) system has attracted a great deal of attention as a technique of enabling high-capacity data communication. In the MIMO system, a radio transmission apparatus spatially multiplexes the transmission data (stream) and transmits the multiplexed transmission data through a plurality of transmission antennas, and a radio reception apparatus receives original transmission data by spatially demultiplexing reception data in which a plurality of transmission data are mixed on a propagation channel (for example, see Non-Patent Literature 1).

In the MIMO system, when $N_{tx}$ is the number of transmission antenna ports and $N_{rx}$ is the number of reception antenna ports, the number of streams that can be multiplexed is obtained by equation 1.

[1]

$$\min(N_{tx}, N_{rx}) \quad \text{(Equation 1)}$$

Here, the function min(x, y) refers to a function that returns a smaller value between x and y. That is, the number of multiplexable streams is set to a smaller number between the number $N_{tx}$ of transmission antenna ports and the number $N_{rx}$ of reception antenna ports. Further, the number of actually multiplexable streams is decided according to the rank indication of a channel matrix of the transmission antenna ports and the reception antenna ports. As the channel correlation between the transmission antenna ports and the channel correlation between the reception antenna ports increase, the rank indication of the channel matrix decreases, whereas as the channel correlation between the transmission antenna ports and the channel correlation between the reception antenna ports decrease, the rank indication of the channel matrix increases.

As an extension system of the MIMO system, a multipath multiplexing system has been suggested that increases the number of streams by using multipath occurring on a propagation channel when the number of transmission antenna ports is larger than the number of reception antenna ports (for example, see Non-Patent Literature 2). Specifically, when $N_{tx}$ is the number of transmission antenna ports, $N_{rx}$ is the number of reception antenna ports, and L is the number of paths, the number of multiplexable streams is obtained by equation 2.

[2]

$$\min(N_{tx}, N_{rx} \times L) \quad \text{(Equation 2)}$$

Similarly to the MIMO system, even in the extension system of the MIMO system, the number of streams that can be multiplexed actually is decided according to the rank indication of the channel matrix of the transmission antenna ports and the reception antenna ports. That is, as the channel correlation between the transmission antenna ports and the channel correlation between the reception antenna ports increase, the rank indication of the channel matrix decreases, whereas as the channel correlation between the transmission antenna ports and the channel correlation between the reception antenna ports decrease, the rank indication of the channel matrix increases.

CITATION LIST

Non-Patent Literature

NPL 1
"On Limits of Wireless Communications in a Fading Environment when Using Multiple Antennas", "Wireless Personal Communications 6: pp. 311-335", "1998", "G. J. FOSCHINI and M. J. GANS"

NPL 2
F. Adachi, K. Adachi, Y. Kojima, K. Takeda, "Study on MIMO Channel Capacity in A Frequency-selective Channel", IEICE General Conference, BS-1-4, March 2008

SUMMARY OF INVENTION

Technical Problem

Generally, in equation 2, since $N_{tx}$ is smaller than ($N_{rx} \times L$), if the number $N_{tx}$ of transmission antennas does not increase, the number of multiplexable streams does not increase. That is, the number of multiplexable streams is restricted by the number $N_{tx}$ of transmission antennas. At this time, in order to achieve the number $N_{tx}$ of multiplexed streams, it is necessary to mount the transmission antennas which have a low channel correlation between antennas so that the rank indication of the channel matrix of the transmission antennas can reach its maximum, that is, the rank indication of the channel matrix can reach $N_{tx}$.

For example, when an operation frequency is 2 GHz to 5 GHz, a wavelength λ of a radio wave is 6 cm (5 GHz) to 15 cm (2 GHz). In general, in the MIMO system, in order to install the antennas which have a low channel correlation, it is necessary to install the antennas at an interval of a distance several times the wavelength λ therebetween. For example, in order to set the antennas at an interval of a distance 5 times the wavelength λ, it is necessary to install the antennas at intervals of 30 cm to 75 cm.

However, in a radio communication system such as a mobile phone system or a wireless local area network (LAN) system, it is desirable to reduce the size of a radio communication terminal apparatus (for example, the radio transmission apparatus and the radio reception apparatus). Thus, in the radio communication system, it is difficult to increase the number $N_{tx}$ of transmission antennas of the radio transmission apparatus. That is, it is difficult to increase the number of multiplexable streams.

Further, each transmission antenna needs a radio transmission circuit for performing a radio transmission process. In the radio transmission process, it is necessary to perform analog signal processing, and thus it is difficult to achieve the proper integration such as large scale integration (LSI). That is, as the number $N_{tx}$ of transmission antennas increases, the circuit size of the radio transmission circuit increases. In addition, since power efficiency of the radio transmission circuit is as low as 50% or less, heat is increasingly generated in the radio transmission apparatus.

As described above, in the radio communication terminal apparatus, it is difficult to increase the number $N_{tx}$ of transmission antennas which have the low channel correlation, and thus it is very difficult to increase the number of multiplexable streams.

It is an object of the present invention to provide a radio relay apparatus and a radio relay method for making it possible to increase a transmission rate and capacity between a radio transmission apparatus and a radio reception apparatus by increasing the number of multiplexed streams between the radio transmission apparatus and the radio reception apparatus without increasing both the number of antennas of the radio transmission apparatus and the number of antennas of the radio reception apparatus.

Solution to Problem

A radio relay apparatus of the present invention is a radio relay apparatus that relays a signal between a radio transmission apparatus and a radio reception apparatus, and includes N antennas ports (N is a natural number of 2 or more), a reception section that performs diversity reception on the signal, which is modulated by an M-ary modulation number of M (here, M≤N×2), transmitted from the radio transmission apparatus through the N antenna ports, a generation section that divides the signal and generates N streams, a modulation section that modulates the N streams by a quadrature phase shift keying (QPSK) scheme, and a transmission section that transmits the modulated N streams to the radio reception apparatus through the N antenna parts.

A radio relay method of the present invention is a radio relay method in a radio relay apparatus that includes N antenna ports (N is a natural number of 2 or more), and relays a signal between a radio transmission apparatus and a radio reception apparatus. The radio relay method includes a reception step of receiving the signal, which is modulated by an M-ary modulation number of M (here, M≤N×2), transmitted from the radio transmission apparatus through the N antenna ports, a generation step of dividing the signal and generating N streams, a modulation step of modulating the N streams by a QPSK scheme, and a transmission step of transmitting the modulated N streams to the radio reception apparatus through the N antenna ports.

Advantageous Effects of Invention

According to the present invention, it is possible to increase the number of multiplexed streams between the radio transmission apparatus and the radio reception apparatus without increasing both the number of antennas of the radio transmission apparatus and the number of antennas of the radio reception apparatus.

DESCRIPTION OF EMBODIMENTS

Hereinafter, embodiments of the present invention will be described in detail with reference to the accompanying drawings.

The following description will be made in connection with a radio communication system including a radio transmission apparatus, a radio relay apparatus, and a radio reception apparatus. Further, in the following description, it is assumed that the radio transmission apparatus and the radio reception apparatus include one antenna each, and the radio relay apparatus includes $N_{relay}$ (here, $N_{relay}$ is a natural number of 2 or more) antennas. In this radio communication system, the radio transmission apparatus transmits a signal, which is addressed to the radio reception apparatus, to the radio relay apparatus. The radio relay apparatus relays the signal between the radio transmission apparatus and the radio reception apparatus. The radio reception apparatus receives the signal transmitted from the radio relay apparatus.

The radio transmission apparatus transmits a signal modulated by an M-ary modulation number of "$N_{relay} \times 2$" to the radio relay apparatus, and the radio relay apparatus performs diversity reception on the signal transmitted from the radio transmission apparatus through the $N_{relay}$ antennas.

Meanwhile, the radio relay apparatus divides the received signal into $N_{relay}$ streams to generate $N_{relay}$ streams. Then, the radio relay apparatus modulates the $N_{relay}$ streams using a QPSK scheme. Then, the radio relay apparatus multipath-multiplexes min ($N_{relay}$, L) pieces of multiplexable streams according to equation 2, and relays the multipath-multiplexed streams to the radio reception apparatus. The radio reception apparatus combines the multipath-multiplexed streams to obtain a reception signal.

Embodiment 1

Figure 1:
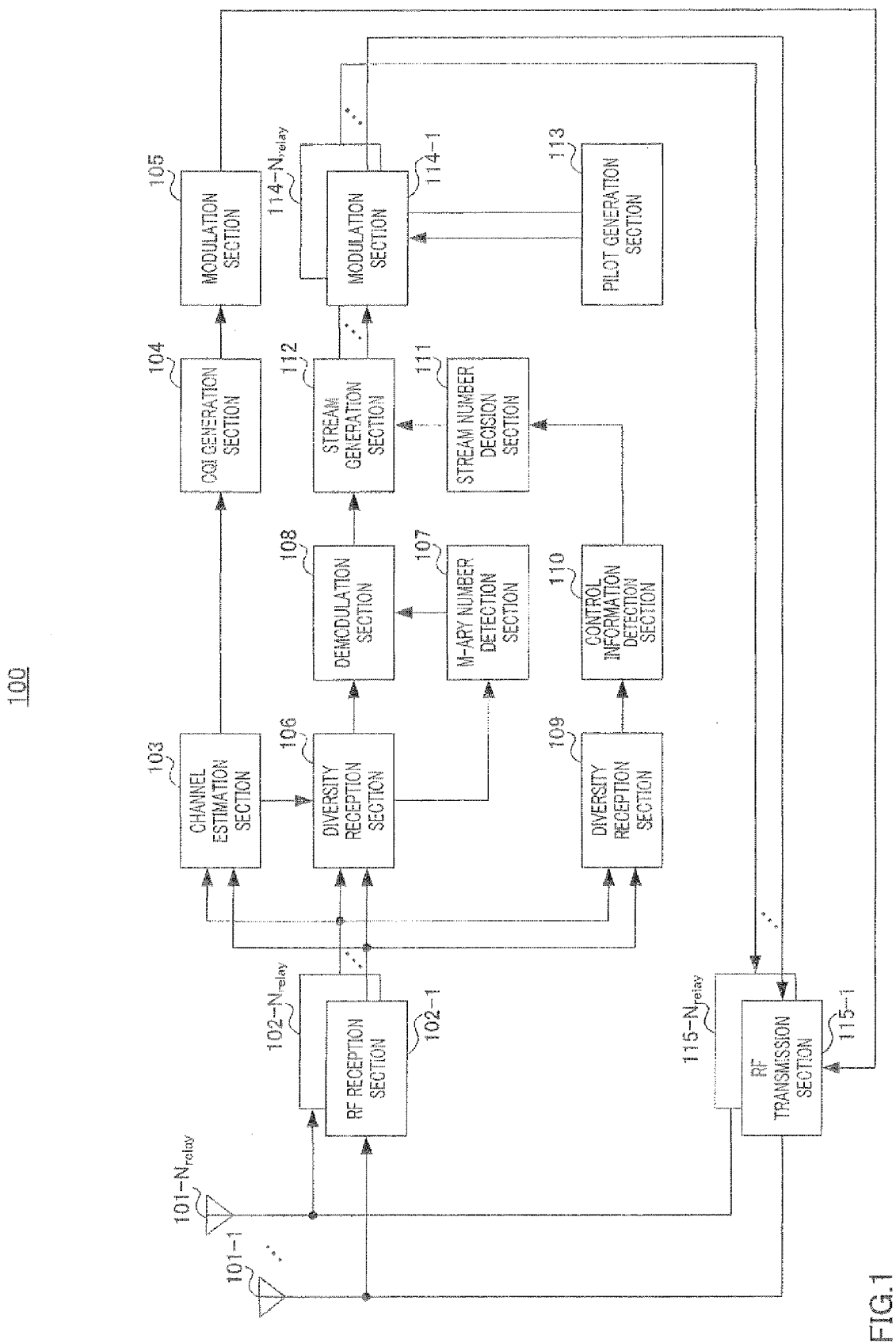
FIG. 1 is a block diagram illustrating a configuration of a radio relay apparatus according to Embodiment 1 of the present invention.

FIG. 1 illustrates a configuration of radio relay apparatus 100 according to the present embodiment.

In radio relay apparatus 100 illustrated in FIG. 1, RF reception sections 102-1 to 102-$N_{relay}$, modulation sections 114-1 to 114-$N_{relay}$, and RF transmission sections 115-1 to 115-$N_{relay}$ are provided so as to correspond to antennas 101-1 to 101-$N_{relay}$, respectively.

In radio relay apparatus 100 illustrated in FIG. 1, RF reception sections 102-1 to 102-$N_{relay}$ receive signals transmitted from the radio transmission apparatus or control information transmitted from a radio reception apparatus through antennas 101-1 to 101-$N_{relay}$, respectively. Then, RF reception sections 102-1 to 102-$N_{relay}$ perform reception processing, such as down conversion or analog-to-digital (A/D) conversion, on the received signals or the control information. Then, each of RE reception sections 102-1 to 102-$N_{relay}$ outputs the reception-processed signal to channel estimation section 103 and diversity reception section 106, and outputs the reception-processed control information to diversity reception section 109. The signals transmitted from the radio transmission apparatus include a data signal, a pilot signal (which is also referred to as a "reference signal"), and M-ary number information representing an M-ary modulation number used for the modulation process of the data signal. The control information transmitted from the radio reception apparatus includes information representing the number L of multipath channels detected by the radio reception apparatus, and information representing the number $N_{rx}$ of receivable antennas set by the radio reception apparatus.

Channel estimation section 103 estimates each of channels between the antenna of the radio transmission apparatus and antennas 101-1 to 101-$N_{relay}$ using the pilot signals included in the signals respectively input from RF reception sections 102-1 to 102-$N_{relay}$. Then, channel estimation section 103 outputs an estimation result (channel estimation value) of each antenna to channel quality indicator (CQI) generation section 104 and diversity reception section 106.

CQI generation section 104 generates a CQI using the channel estimation value of each antenna input from channel estimation section 103. Then, CQI generation section 104 outputs the generated CQI to modulation section 105.

Modulation section 105 modulates the CQI input from CQI generation section 104, and outputs the modulated CQI to RF transmission section 115-1.

Diversity reception section 106 performs a diversity reception process on the respective signals, respectively, input from RF reception sections 102-1 to 102-$N_{relay}$ using the channel estimation values, between the antenna of the radio transmission apparatus and antennas 101-1 to 101-$N_{relay}$, input from channel estimation section 103. That is, diversity reception section 106 performs the diversity reception on the data signals, which have been modulated by the M-ary modulation number of "$N_{relay} \times 2$", transmitted from the radio transmission apparatus through $N_{relay}$ antennas 101-1 to 101-$N_{relay}$. Then, diversity reception section 106 outputs the signal, which has been subjected to the diversity reception process, to Mary number detection section 107 and demodulation section 108.

M-ary number detection section 107 detects M-ary number information from the signal input from diversity reception section 106. Then, M-ary number detection section 107 outputs an M-ary modulation number (here, $N_{relay} \times 2$) indicated in the detected M-ary number information to demodulation section 108.

Demodulation section 108 demodulates a data signal included in the signal input from diversity reception section 106 using the M-ary modulation number (here, $N_{relay} \times 2$) input from M-ary number detection section 107. Then, demodulation section 108 outputs the demodulated data signal (data bits) to stream generation section 112. Demodulation section 108 may perform an error correction process on the data signal. Further, demodulation section 108 may output the demodulated data signal (data bits) as a soft decision value.

Diversity reception section 109 performs the diversity reception process on the control information (the control information transmitted from the radio reception apparatus) input from each of RF reception sections 102-1 to 102-$N_{relay}$. Then, diversity reception section 109 outputs the control information, which has been subjected to the diversity reception process, to control information detection section 110.

Control information detection section 110 detects information representing the number $N_{rx}$ of receivable antennas in the radio reception apparatus and information representing the number L of multipath channels from the control information input from diversity reception section 109. Then, control information detection section 110 outputs the detected number $N_{rx}$ of antennas and the number L of multipath channels to stream number decision section 111. Stream number decision section 111 decides a multiplexing stream number based on the detected number $N_{rx}$ of antennas and the number L of multipath channels input from control information detection section 110. For example, stream number decision section 111 decides the multiplexing stream number of "$N_{rx} \times L$" or less (here, $N_{relay}$) according to equation 2. Then, stream number decision section 111 outputs the decided multiplexing stream number to stream generation section 112.

Stream generation section 112 divides the data signal (data bits) input from demodulation section 108 and generates stream data (here, $N_{relay}$ pieces of stream data) by the amount as much as the number of multiplexing streams input from stream number decision section 111. Then, stream generation section 112 outputs the plurality of generated stream data ($N_{relay}$ pieces of stream data) to corresponding modulation sections 114-1 to 114-$N_{relay}$, respectively.

Pilot generation section 113 generates a plurality of pilot signals which are to be transmitted to the radio reception apparatus through antennas 101-1 to 101-$N_{relay}$, and outputs the plurality of generated pilot signals to modulation sections 114-1 to 114-$N_{relay}$, respectively. The pilot signals generated by pilot generation section 113 are signals used for the radio reception apparatus to detect the number of multipath channels between radio relay apparatus 100 and the radio reception apparatus.

Modulation sections 114-1 to 114-$N_{relay}$ modulate the stream data input from stream generation section 112 and the pilot signals input from pilot generation section 113 using a QPSK scheme (that is, the M-ary modulation number=2). Then, modulation sections 114-1 to 114-$N_{relay}$ output the modulated stream data and the modulated pilot signals to RF transmission sections 115-1 to 115-$N_{relay}$.

RF transmission sections 115-1 to 115-$N_{relay}$ perform a transmission process, such as digital-to-analog (D/A) conversion, amplification, and up-conversion, on the stream data and the pilot signals input from modulation sections 114-1 to 114-$N_{relay}$ and the CQI input from modulation section 105. Then, RF transmission sections 115-1 to 115-$N_{relay}$ transmit the stream data and the pilot signals to the radio reception apparatus through $N_{relay}$ antennas 101-1 to 101-$N_{relay}$. Radio relay apparatus 100 performs pre-coding on the stream data transmitted through antennas 101-1 to 101-$N_{relay}$ using a pre-coding matrix which is a weight for setting the number of multipath channels to $N_{relay}$. By this means, the $N_{relay}$ pieces of stream data can be spatially multiplexed and transmitted to the radio reception apparatus, and the radio reception apparatus can receive the $N_{relay}$ pieces of stream data through $N_{relay}$ multipath channels. In addition, RF transmission section 115-1 transmits the CQI to the radio transmission apparatus through antenna 101-1.

The radio reception apparatus estimates propagation channels of multipath using the respective pilot signals transmitted from antennas 101-1 to 101-$N_{relay}$ of radio relay apparatus 100. The radio reception apparatus detects the number L of multipath channels using the channel estimation value which is an estimation result. Here, the radio reception apparatus two-dimensionally separates the streams of $N_{rx} \times L$ in a spatial domain and a time domain. Here, since $N_{rx}$ is 1, all streams are multiplexed in the time domain. Thus, the radio reception apparatus separates the multipath channels based on the channel estimation value and the number L of multipath channels, and obtains $N_{relay}$ pieces of stream data. Then, the radio reception apparatus combines the $N_{relay}$ streams and obtains the combined data as reception data. In addition, the radio reception apparatus transmits control information including the detected number L of multipath channels and the number $N_{rx}$ of receivable antennas (here, $N_{rx}$=1) to radio relay apparatus 100.

Next, a description will be made in connection with the details of a relay process of radio relay apparatus 100 according to the present embodiment.

First, a description will be made in connection with communication between radio relay apparatus 100 and the radio reception apparatus.

The number of antennas of radio relay apparatus 100 is $N_{relay}$, and the number $N_{rx}$ of antennas of the radio reception apparatus is 1. Thus, the number of multiplexable streams becomes $\min(N_{relay}, L (=L \times 1))$ according to equation 2. In a mobile communication system, it has been known that sufficient multipath channels are generated. That is, in equation 2 described above, there is a high possibility that the number L of multipath channels is larger than $N_{relay}$. Thus, even when the number $N_{rx}$ of antennas of the radio reception apparatus is only one (1), if the number L of multipath channels is equal to or more than $N_{relay}$ (that is, $L \geq N_{relay}$), the number of multiplexable streams becomes $N_{relay}$.

That is, between radio relay apparatus 100 and the radio reception apparatus, when the number L of multipath channels is equal to or more than the number $N_{relay}$ of antennas of radio relay apparatus 100, as the number $N_{relay}$ of antennas of radio relay apparatus 100 increases, the number of multiplexable streams can be further increased. Specifically, when $L \geq N_{relay}$ is satisfied, the number of multiplexable streams increases in proportion to an increase in the number $N_{relay}$ of antennas. Radio relay apparatus 100 includes the $N_{relay}$ antennas, divides the data signal transmitted from the radio transmission apparatus, and generates the $N_{relay}$ pieces of stream data. As a result, it is possible to spatially multiplex the $N_{relay}$ pieces of stream data between radio relay apparatus 100 and the radio reception apparatus.

Then, radio relay apparatus 100 modulates the $N_{relay}$ pieces of stream data using the QPSK scheme and transmits the modulated stream data in parallel. Here, by changing the multiplexing number of the stream data which has been modulated by the QPSK scheme, which is a modulation scheme that is most excellent in a reception signal-to-noise ratio (SNR) characteristic per bit, that is, in an Eb/No characteristic, the transmission rate which is proportional to the reception SNR per bit is obtained. That is, as the number of streams which is the possible number of the stream data modulated by the QPSK scheme to be transmitted in parallel, that is, the number $N_{relay}$ of antennas of radio relay apparatus 100 increases, the transmission rate proportional to the number $N_{relay}$ of antennas increases. As described above, between radio relay apparatus 100 and the radio reception apparatus, it is possible to increase the transmission rate by multipath-multiplexing to a maximum extent using the QPSK which is most excellent in the reception SNR characteristic per bit.

In the present embodiment, an effect basically different from a conventional transmission diversity technique lies in that when the reception power of the radio reception apparatus becomes K times greater, the transmission rate increases by K times, that is, it is possible to increase the transmission rate in proportion to the reception power of the radio reception apparatus.

In the present embodiment, characteristics of radio relay apparatus 100 (relay station) are used so as to increase the radio reception power of the radio reception apparatus by K times. That is, in the present embodiment, as characteristics of radio relay apparatus 100 (relay station), it is taken into account that radio relay apparatus 100 remains stably connected to power, and it is possible to increase the size of the housing of radio relay apparatus 100 compared to the mobile communication terminal apparatus. By this means, radio relay apparatus 100 can transmit a signal at power higher than the mobile communication terminal apparatus.

In addition, the characteristics of radio relay apparatus 100 (relay station) are used even in connection with "installation of the transmission antenna which have a low channel correlation (spatial correlation)" which is difficult to implement in the mobile communication terminal apparatus. That is, as characteristics of radio relay apparatus 100, it is taken into account that since the housing of radio relay apparatus 100 is larger than the mobile communication terminal apparatus, a plurality of antennas can be installed at intervals between antennas.

Here, Shannon's transmission channel capacity can be represented by equation 3. In equation 3, B represents a bandwidth, S represents signal power, and N represents noise power.

[3]

$$B \log_2(1+S/N) \qquad \text{(Equation 3)}$$

In the equation of the Shannon's transmission channel capacity represented by equation 3, the transmission rate (that is, the transmission channel capacity) increases with the increase in a logarithmic value ($\log_2$) of the signal power S, whereas in the present invention, as described above, the transmission rate (that is, the transmission channel capacity) increases in proportion to the signal power. As described above, in the present invention, the transmission rate (that is, the transmission channel capacity) can be increased in proportion to the signal power.

This is because radio relay apparatus 100 (relay station) can perform transmission at the same transmission power as transmission power of the mobile communication terminal apparatus (including one antenna) through each of the $N_{relay}$ antennas, and the capacity of equation 3 can be achieved by each of the transmission antennas of radio relay apparatus 100. That is, radio relay apparatus 100 can increase the capacity by $N_{relay}$ times (in proportion to $N_{relay}$) compared to transmission and reception using one antenna.

In addition, radio relay apparatus 100 can reduce the channel correlation between the antennas by increasing an interval between antennas. Thus, radio relay apparatus 100 can further increase the capacity by using an eigen value in the channel matrix at maximum.

Next, a description will be made in connection with communication between the radio transmission apparatus and radio relay apparatus 100.

As described above, in communication between radio relay apparatus 100 and the radio reception apparatus, radio relay apparatus 100 multipath-multiplexes the $N_{relay}$ pieces of stream data modulated by the QPSK scheme and transmits the modulated stream data, making it possible to increase the transmission rate. Thus, even between the radio transmission apparatus and radio relay apparatus 100, it is necessary to increase the transmission rate with the increase in the transmission rate between radio relay apparatus 100 and the radio reception apparatus. To this end, an M-ary modulation scheme may be used as a technique of increasing the transmission rate without increasing the number of antennas of the radio transmission apparatus (including one antenna) and increasing the transmission band. In the M-ary modulation scheme, the transmission rate can be increased by increasing the number of bits per symbol.

However, in the Mary modulation scheme, as the M-ary modulation number increases, the number of bits to be transmitted by one symbol increases, however, a plurality of bits transmitted by one symbol differ in an error rate. Specifically, in a plurality of bits transmitted by one symbol, as the bit position is close to the least significant bit position, the occurrence of an error increases. Thus, as the M-ary modulation number increases, a packet error rate (PER) with respect to the reception SNR per bit increases. For this reason, as the M-ary modulation number increases, reception power (desired reception SNR) required for satisfying a certain error rate (a desirable PER) increases. For this reason, in the M-ary modulation scheme, as the M-ary modulation number increases (that is, as the reception power (reception SNR) per bit increases), it is more difficult to obtain the transmission rate proportional to the reception power (reception SNR).

However, radio relay apparatus 100 includes the $N_{relay}$ antennas for increasing the number of multiplexable streams when multipath-multiplexing the data signal and transmitting the multiplexed data signal to the radio reception apparatus. Thus, when the transmission antenna is used as the reception antennas, radio relay apparatus 100 can perform the diversity reception on the M-ary modulated data signal from the radio transmission apparatus using the $N_{relay}$ antennas.

Figure 2:
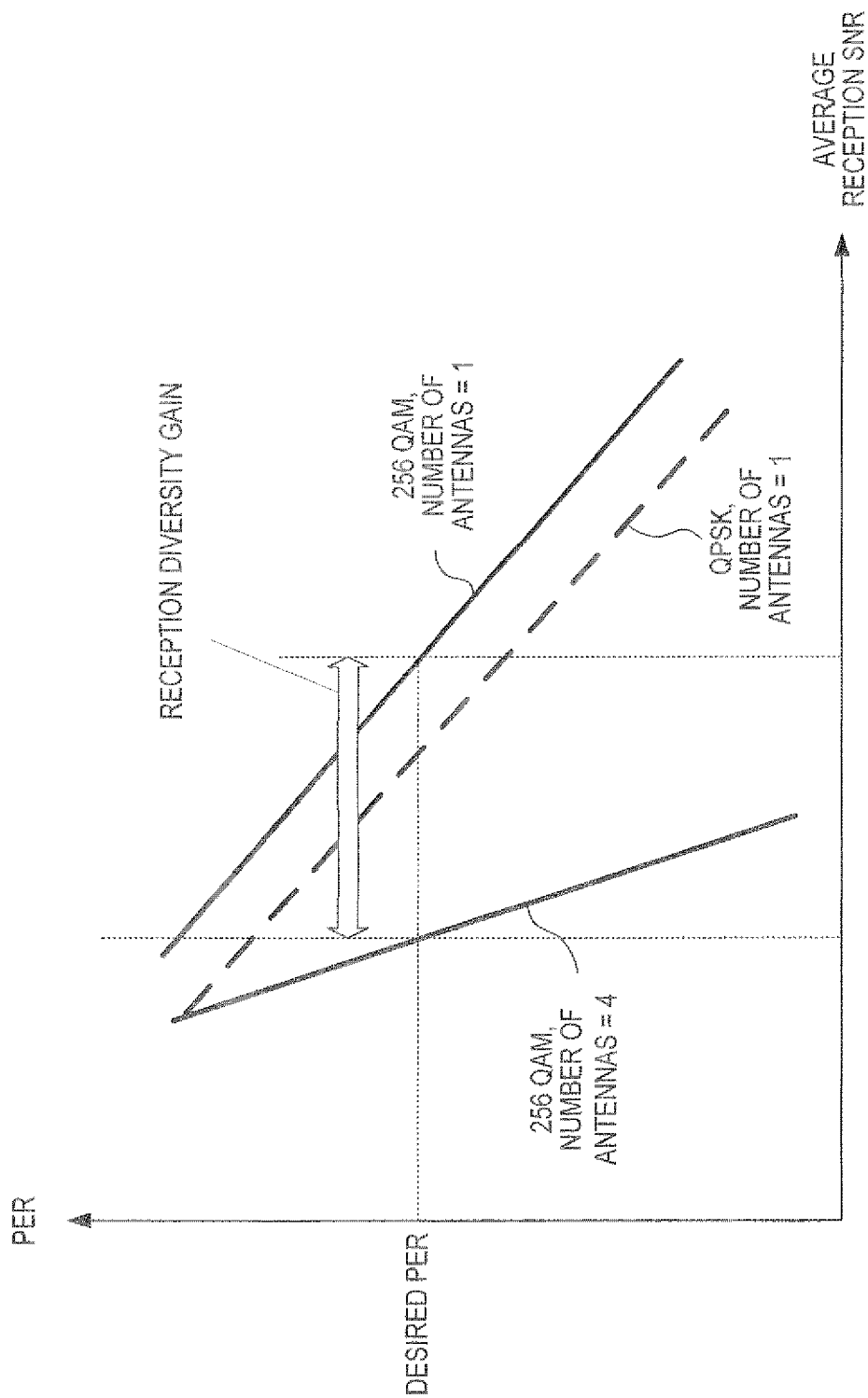
FIG. 2 is a diagram illustrating a relation between an average reception SNR and a PER in each modulation scheme and the number of reception antennas according to Embodiment 1 of the present invention.

FIG. 2 illustrates PER characteristics with respect to an average reception SNR (average reception power). As illustrated in FIG. 2, when the number of antennas at a reception side (here, radio relay apparatus 100) is one (1), and a modulation scheme is a 256 quadrature amplitude modulation (QAM) (8 bits per symbol), an average reception SNR (required reception SNR) necessary for obtaining a desired PER is higher than an average reception SNR (required reception SNR) necessary for obtaining a desired PER when the number of antennas at the reception side is one (1), and a modulation scheme is a QPSK (2 bits per symbol).

On the other hand, when the number of antennas at the reception side is four (4), and a modulation scheme is a 256 QAM, an average reception SNR necessary for obtaining a desired PER is much lower than an average reception SNR necessary for obtaining a desired PER when the number of antennas at the reception side is one (1), and a modulation scheme is a QPSK. That is, radio relay apparatus 100 performs diversity-reception on the data signal (the M-ary modulated data signal) from the radio transmission apparatus using the $N_{relay}$ antennas, so that the increase in the required reception SNR when the M-ary modulation is used can be suppressed by increasing the number of antennas. That is, by radio relay apparatus 100 which performs the diversity reception using the $N_{relay}$ antennas, a reception diversity gain illustrated in FIG. 2 can be obtained. As described above, even though the M-ary modulation number of the data signals from the radio transmission apparatus is large, since radio relay apparatus 100 includes the $N_{relay}$ antennas, while suppressing the required reception SNR, the transmission rate can be increased without increasing the transmission bandwidth.

As described above, radio relay apparatus 100 according to the present embodiment performs the diversity reception on the M-ary modulated data signal from the radio transmission apparatus through the $N_{relay}$ antennas, divides the diversity reception data signal to generate the $N_{relay}$ pieces of stream data, multipath-multiplexes the $N_{relay}$ pieces of stream data, and transmits the multiplexed stream data to the radio reception apparatus. That is, when relaying the data signal, radio relay apparatus 100 employs a communication scheme at the time of data signal transmission which is different from a communication scheme at the time of data signal reception. The communication scheme is changed to a frequency domain in a frequency division duplex (FDD) system but is changed to a time domain in a time division duplex (TDD) system. In addition, in a duplex system other than the FDD or the TDD, a communication scheme is changed to a duplex domain. As a result, the radio transmission apparatus having only one antenna can transmit the data signal at a high transmission rate using the M-ary modulation scheme. In addition, the radio reception apparatus having only one antenna can receive the data signal at a high transmission rate using the multipath multiplexing scheme. That even though the radio transmission apparatus and the radio reception apparatus may have only one antenna, the number of multiplexed streams can be increased in proportion to the number $N_{relay}$ of antennas of radio relay apparatus 100.

Further, when radio relay apparatus 100 includes the $N_{relay}$ antennas, the $N_{relay}$ pieces of stream data can be multiplexed between radio relay apparatus 100 and the radio reception apparatus. Further, each stream data may be modulated by the QPSK (2 bits per symbol) scheme. Thus, by transmitting the $N_{relay}$ pieces of stream data (2 bits per symbol) in parallel, radio relay apparatus 100 can obtain a transmission rate which is $N_{relay}$ times as higher as the transmission rate of the QPSK.

Meanwhile, in communication between the radio transmission apparatus and radio relay apparatus 100, the data signal can be M-ary modulated using the modulation scheme capable of transmitting information of ($N_{relay}$×2) bits per symbol, in accordance with the transmission rate ($N_{relay}$ times as high as 2 bits per symbol) between radio relay apparatus 100 and the radio reception apparatus.

Figure 3:
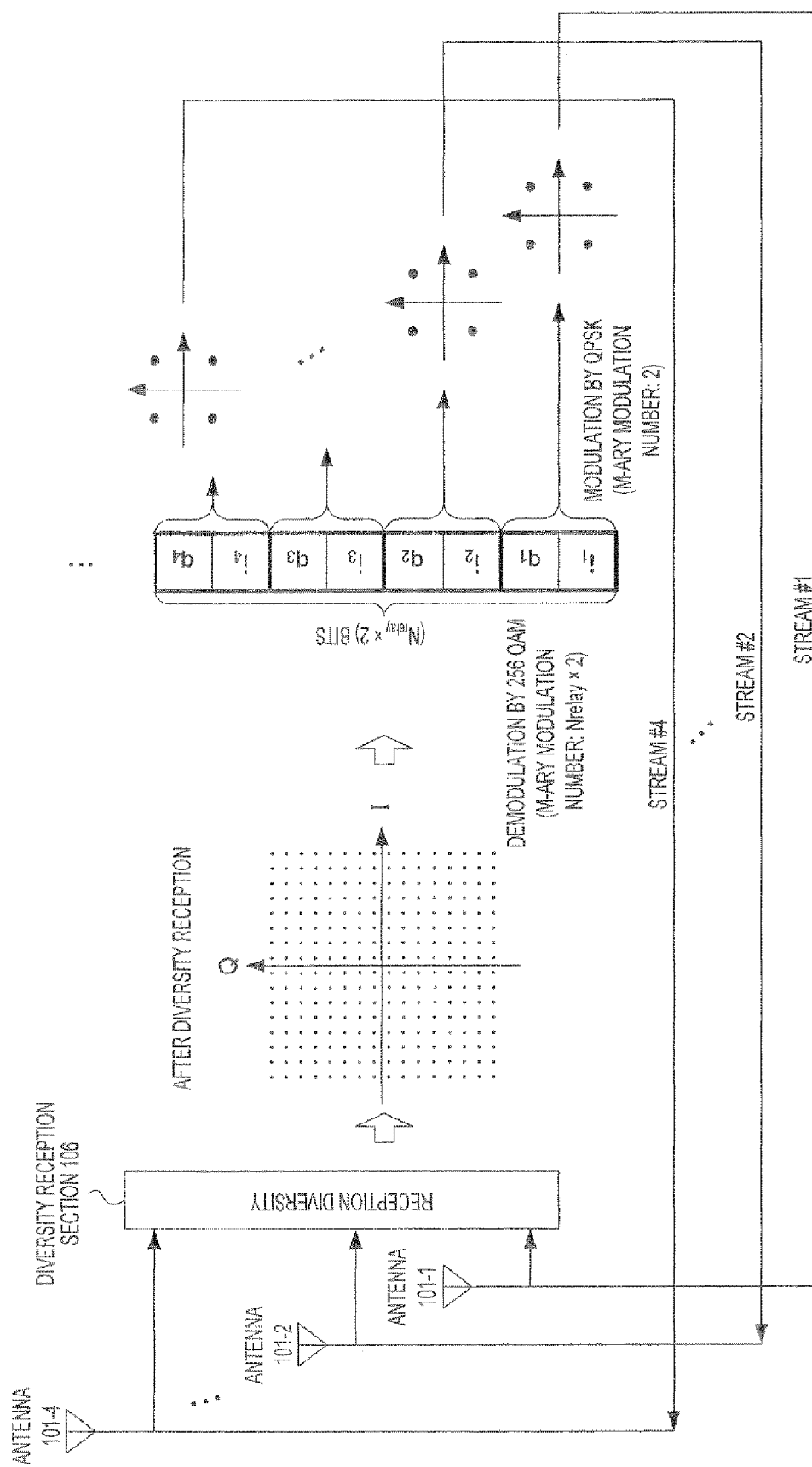
FIG. 3 is a diagram illustrating a relay process of a radio relay apparatus according to Embodiment 1 of the present invention.

Next, a description will be made in connection with an example in which the number $N_{relay}$ of antennas of radio relay apparatus 100 is four (4) as illustrated in FIG. 3. That is, radio relay apparatus 100 includes antennas 101-1 to 101-4. In this case, the radio transmission apparatus modulates the data signal using the 256 QAM scheme (the M-ary modulation number: 8 (=$N_{relay}$×2)). Here, the M-ary modulation number refers to the number of bits to be transmitted by one symbol.

Meanwhile, as illustrated in FIG. 3, diversity reception section 106 of radio relay apparatus 100 performs respective diversity reception process on data signals, received by antennas 101-1 to 101-4. By this means, diversity reception section 106 obtains a data signal modulated by the 256 QAM scheme (a data signal including information of 8 bits per symbol) as illustrated in FIG. 3. Then, demodulation section 108 obtains data bits (here, $i_1$, $q_1$, $i_2$, $q_2$, $i_3$, $q_3$, $i_4$, and $q_4$) of 8 $N_{relay}$×2) bits per symbol by demodulating the data signal obtained by the diversity reception process by the 256 QAM scheme.

Subsequently, as illustrated in FIG. 3, stream generation section 112 divides the data bits obtained by demodulation section 108 and generates 4 (=$N_{relay}$) streams (here, streams #1 to #4). In FIG. 3, for example, bits $i_1$ and $q_1$ are arranged in stream #1, and bits $i_2$ and $q_2$ are arranged in stream #2. The remaining bits are arranged in streams #3 and #4 in the same manner.

Then, as illustrated in FIG. 3, modulation sections 114-1 to 114-4 (FIG. 1) modulate the respective corresponding stream data (streams #1 to #4) using the QPSK scheme. That is, the stream data including information of 2 bits per symbol is obtained.

Then, radio relay apparatus 100 simultaneously transmits streams #1 to #4 through antennas 101-1 to 101-4.

Meanwhile, the radio reception apparatus can receive the 4 pieces of stream data (streams #1 to #4 illustrated in FIG. 3) by demultiplexing 4 (=$N_{relay}$) multipath channels.

Thus, the radio transmission apparatus having only one antenna can transmit the M-ary modulated (the M-ary modulation number=$N_{relay}$×2) data signal in view of diversity reception by the $N_{relay}$ antennas installed in radio relay apparatus 100. In addition, the radio reception apparatus having only one antenna can receive the $N_{relay}$ pieces of stream data which have been multiplexed by the number $N_{relay}$ of antennas installed in radio relay apparatus 100 and modulated by the QPSK scheme (the M-ary modulation number=2). That is, between the radio transmission apparatus and the radio reception apparatus, it is possible to increase the multiplexing number of the multipath-multiplexed stream data in proportion to the number $N_{relay}$ of antennas of radio relay apparatus 100 even though the radio transmission apparatus and the radio reception apparatus have only one antenna each.

As described above, according to the present embodiment, even when each of the radio transmission apparatus and the radio reception apparatus has one antenna, by increasing the number $N_{relay}$ of antennas of radio relay apparatus 100, it is possible to increase the number of streams multiplexable between the radio transmission apparatus and the radio reception apparatus. Thus, according to the present embodiment, it is possible to obtain an effect capable of increasing the number of streams multiplexable between the radio transmission apparatus and the radio reception apparatus without increasing both the number of antennas of the radio transmission apparatus and the number of antennas of the radio reception apparatus.

In the present invention, the above effect is obtained by using the following characteristics of the radio relay apparatus (relay station): the housing of the radio relay apparatus can be designed to have a larger size than the mobile communication terminal apparatus; power is stable and thus an increased transmission power is allowed; and installation of a plurality of antennas having a lower channel correlation is allowed so that a high power can be transmitted from each antenna.

In addition, the above effect can be obtained by the technique that the radio relay apparatus does not merely relay a plurality of streams, but switches to the modulation scheme which is excellent in the Eb/No characteristic (the reception SNR characteristic per bit) such as the QPSK modulation scheme, thereby modulating each stream, and thus transmitting the modulated stream through a plurality of antennas. This effect is not obtained in a conventional radio relay apparatus (relay station) such as a radio relay apparatus (relay station) that simply relays streams through multiple antennas or a radio relay apparatus (relay station) that simply relays MIMO signals through multiple antennas.

The present embodiment has been described in connection with the example in which the M-ary modulation number of the signal to be transmitted from the radio transmission apparatus to the radio relay apparatus is decided such that the radio relay apparatus receives the control information (control channel) from the radio reception apparatus, obtains information about the number of streams multiplexable by channels between the radio relay apparatus and the radio reception apparatus, and further notifies the radio transmission apparatus of the generated CQI. However, in the present invention, the method of deciding the M-ary modulation number in the radio transmission apparatus is not limited to the above method. For example, the radio transmission apparatus may receive the control information directly from the radio reception apparatus, and may decide the M-ary modulation number of the signal to be transmitted to the radio relay apparatus based on the received control information. For example, in the present embodiment, the radio transmission apparatus may receive the control information representing the number (delay wave number) L of multipath channels directly from the radio reception apparatus, modulate the signal by the M-ary modulation number of "L×2", and transmit the modulated signal to the radio relay apparatus.

Embodiment 2

As described above, the M-ary modulated data signal is transmitted and received between the radio transmission apparatus and the radio relay apparatus. At this time, the radio relay apparatus performs the diversity reception process on the M-ary modulated data signal based on the channel estimation value estimated using the pilot signal transmitted from the radio transmission apparatus.

For this reason, it is desirable to use a pilot signal that allows determination of the M-ary modulated data signal (signal point determination) to be accurately performed in the radio relay apparatus as the pilot signal used between the radio transmission apparatus and the radio relay apparatus. That is; it is desirable to use a pilot signal whose phase and amplitude (power) can be accurately detected in the radio relay apparatus as the pilot signal used between the radio transmission apparatus and the radio relay apparatus.

Meanwhile, a plurality of multipath-multiplexed stream data are transmitted and received between the radio relay apparatus and the radio reception apparatus. At this time, the radio reception apparatus demultiplexes the plurality of multipath-multiplexed stream data for each multipath using the channel estimation value estimated using the pilot signal transmitted from the radio relay apparatus.

For this reason, a pilot signal that allows multipath demultiplexing to be accurately performed in the radio reception apparatus, that is, a pilot signal that is excellent in multipath resolution is preferably used as the pilot signal used between the radio relay apparatus and the radio reception apparatus.

Thus, in the present embodiment, a spreading sequence using a power maximum point is used for the pilot signal that the radio relay apparatus receives from the radio transmission apparatus, and a zero autocorrelation (ZAC) sequence that is excellent in an autocorrelation characteristic is used for the pilot signal that the radio relay apparatus transmits to the radio transmission apparatus.

That is, channel estimation section 103 (FIG. 1) of radio relay apparatus 100 according to the present embodiment estimates channels between the antenna of the radio transmission apparatus and antennas 101-1 to 101-$N_{relay}$ using a pilot (hereinafter, referred to as "spreading sequence pilot") configured with a spreading sequence transmitted from the radio transmission apparatus.

Then, diversity reception section 106 performs the diversity reception on the data signal through $N_{relay}$ antennas 101-1 to 101-$N_{relay}$ using the channel estimation value estimated using the spreading sequence pilot.

Here, the spreading sequence pilot refers to a pilot signal using a power maximum point, that is, a symbol having high power (for example, a most significant point of a QAM symbol). For this reason, channel estimation section 103 can accurately estimate information related to a phase and amplitude (power) of a signal using the spreading sequence pilot. As described above, the spreading sequence pilot is excellent in detecting a phase and amplitude of a signal.

Meanwhile, pilot generation section 113 of radio relay apparatus 100 generates a constant amplitude and zero autocorrelation code (CAZAC) sequence pilot (hereinafter, "CAZAC sequence pilot") which is a sort of ZAC sequence as the pilot signal transmitted through antennas 101-1 to 101-$N_{relay}$.

Then, RF transmission sections 115-1 to 115-$N_{relay}$ transmit CAZAC sequence pilots, respectively, modulated by modulation sections 114-1 to 114-$N_{relay}$ to the radio reception apparatus through $N_{relay}$ antennas 101-1 to 101-$N_{relay}$.

Here, the CAZAC sequence refers to a sequence that does not have a variation in the amplitude of a signal and is excellent in autocorrelation characteristic. For this reason, when radio relay apparatus 100 transmits the CAZAC sequence pilot to the radio reception apparatus, the radio reception apparatus can reliably detect pilot signals having different timings. That is, the radio reception apparatus can accurately estimate information related to an arrival time of each path by estimating the channels using the CAZAC sequence pilots, and thus can reliably separate the multipath channels. As described above, the CAZAC sequence pilot is excellent in the multipath resolution.

According to the present embodiment, pilot signals having characteristics suitable for respective communication schemes are used as the pilot signal used between the radio transmission apparatus and the radio relay apparatus and the pilot signal used between the radio relay apparatus and the radio reception apparatus. By this means, the radio relay apparatus can accurately determine the Mary modulated data signal from the radio transmission apparatus, and the radio reception apparatus can accurately separate the multipath channels and accurately demultiplex a plurality of multiplexed stream data from the radio relay apparatus. Thus, according to the present embodiment, by using the pilot according to the communication scheme, it is possible to obtain the same effect as in Embodiment 1, and also improve an error rate characteristic of a data signal in each communication path, making it possible to improve the system throughput.

The present embodiment has been described in connection with the example in which the spreading sequence pilot is used as the pilot signal used between the radio transmission apparatus and the radio relay apparatus, and the CAZAC sequence pilot is used as the pilot signal used between the radio relay apparatus and the radio reception apparatus. However, in the present embodiment, the pilot signal between the radio transmission apparatus and the radio relay apparatus is not limited to the spreading sequence pilot, and any pilot signal which allows the phase and amplitude (power) of a signal to be accurately detected may be used. In addition, in the present embodiment, the pilot signal used between the radio relay apparatus and the radio reception apparatus is not limited to the CAZAC sequence pilot, and any pilot signal that is excellent in the multipath resolution may be used.

Embodiment 3

Bits transmitted by one symbol differ in reception quality. Specifically, among a plurality of bits transmitted by one symbol, the reception quality increases as the bit position increases, however, the reception quality decreases as the bit position decreases. For example, in the 256 QAM scheme, 8 bits (for example, $i_1$, $q_1$, $i_2$, $q_2$, $i_3$, $q_3$, $i_4$, and $q_4$ in order from the high-order bit) are transmitted by one symbol. At this time, bits $i_1$ and $q_1$ which are most significant bits are highest in the reception quality, and bits $i_4$ and $q_4$ which are least significant bits are lowest in the reception quality.

Further, since the propagation channel characteristics of propagation channels (channels) between the $N_{relay}$ antennas of the radio relay apparatus and the radio reception apparatus are different from one another, the $N_{relay}$ streams respectively transmitted through the $N_{relay}$ antennas are different in reception quality from one another.

Thus, in the present embodiment, the radio relay apparatus arranges bits configuring each symbol of the data signal transmitted from the radio transmission apparatus in each stream according to the reception quality of the stream.

A concrete description will be made below. Diversity reception section 109 (FIG. 1) of radio relay apparatus 100 according to the present embodiment performs the diversity reception on the control information transmitted from the radio reception apparatus. The control information transmitted from the radio reception apparatus includes channel information representing the channel quality (that is, the quality of each stream) between each of antennas 101-1 to 101-$N_{relay}$ of radio relay apparatus 100 and the antenna of the radio reception apparatus in addition to information representing the number L of multipath channels decided by the radio reception apparatus and the number $N_{rx}$ of receivable antennas set by the radio reception apparatus.

Control information detection section 110 detects the number $N_{rx}$ of receivable antennas of the radio reception apparatus, the number L of multipath channels, and the channel information from the control information input from diversity reception section 109. Then, control information detection section 110 outputs the detected number $N_{rx}$ of antennas and the number L of multipath channels to stream number decision section 111, and outputs the channel information to stream generation section 112 via stream number decision section 111.

Stream generation section 112 divides the data signal (data bits) input from demodulation section 108 based on the reception quality of each stream indicated by the channel information detected by control information detection section 110, and generates $N_{relay}$ pieces of stream data. Specifically, stream generation section 112 arranges a high-order bit, among a plurality of bits configuring each symbol of the data signal (data bits), in a stream having a good reception quality, and arranges a low-order bit in a stream having a bad reception quality.

Meanwhile, the radio reception apparatus estimates a channel quality between each of the antennas of radio relay apparatus 100 and the antenna of the radio reception apparatus using the pilot signal transmitted through each antenna of radio relay apparatus 100. Then, the radio reception apparatus transmits control information (which is the same as in Embodiment 1, that is, control information including the detected $N_{rx}$ number of antennas and the number L of multipath channels) including the channel information representing the channel quality of each antenna of radio relay apparatus 100, to radio relay apparatus 100.

Next, the details of a relay process of radio relay apparatus 100 according to the present embodiment will be described.

Figure 4:
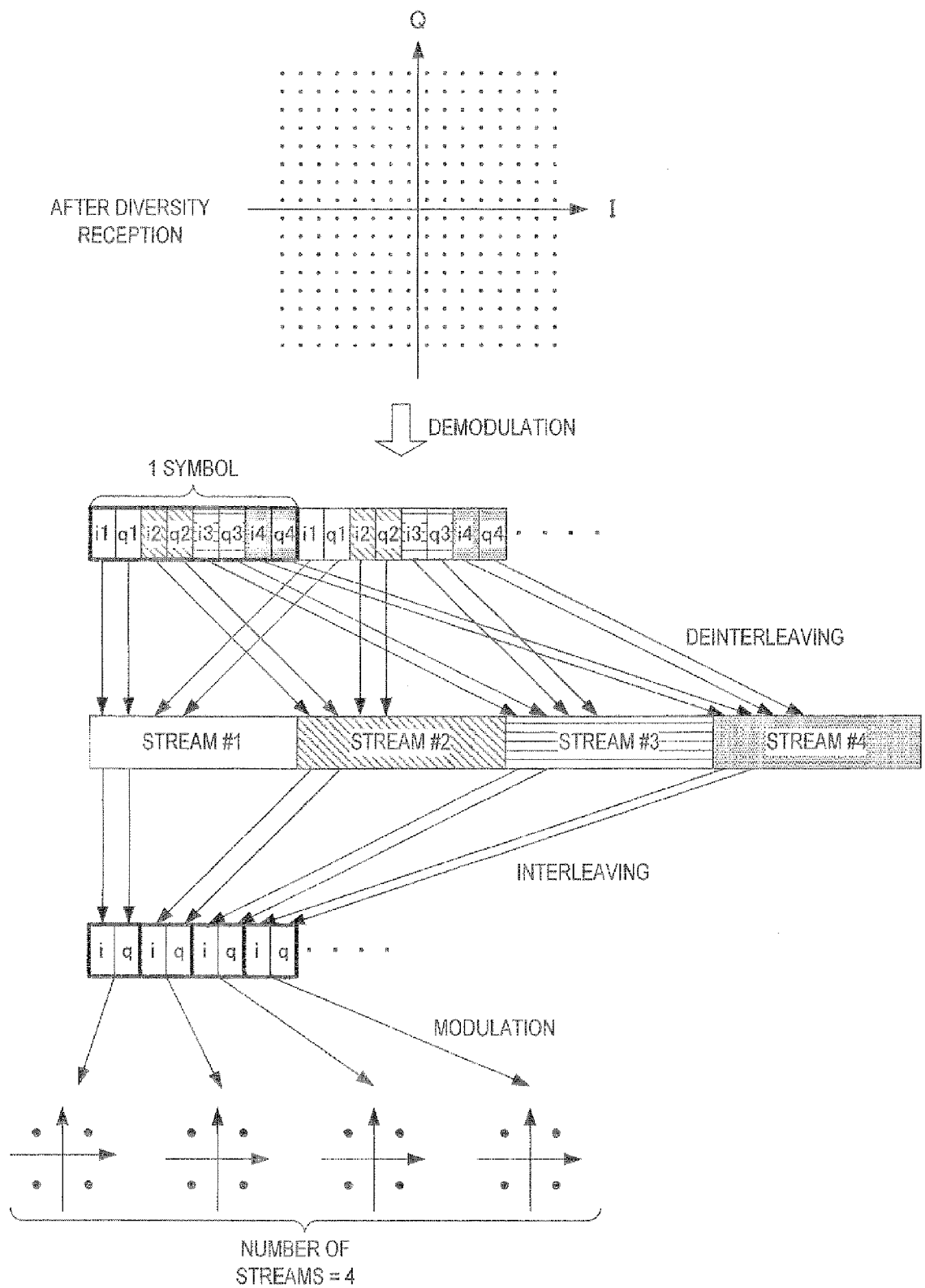
FIG. 4 is a diagram illustrating a relay process of a radio relay apparatus according to Embodiment 3 of the present invention.
Figure 5:
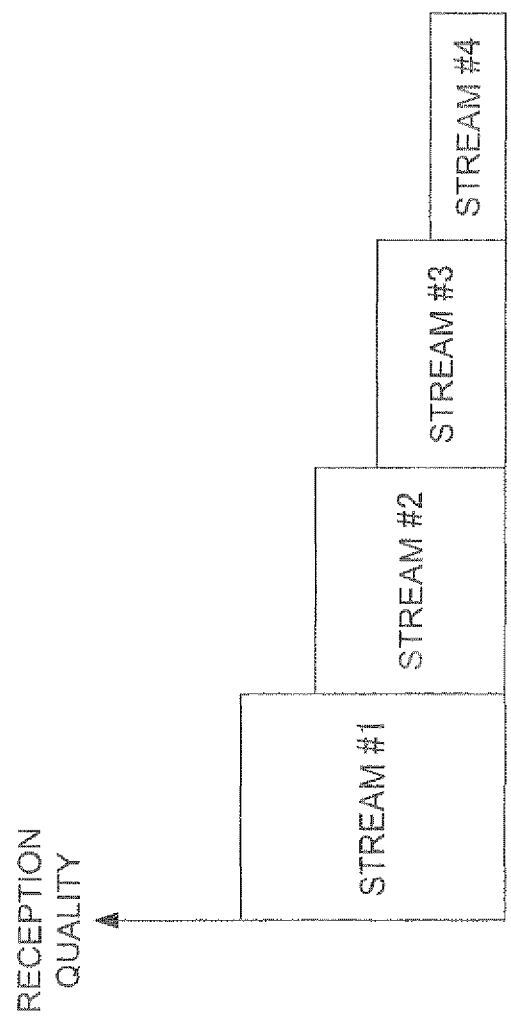
FIG. 5 is a diagram illustrating an example of a reception quality of each stream according to Embodiment 3 of the present invention.

In the following description, it is assumed that the number of antennas of radio relay apparatus 100 is four (4) ($N_{relay}$=4). Thus, the radio transmission apparatus transmits the data signal modulated by the 256 QAM scheme (the M-ary modulation number: $N_{relay} \times 2$, that is, 8 bits per symbol) to radio relay apparatus 100. Further, 8 bits configuring each symbol of the data signal modulated by the 256 QAM scheme are represented by $i_1$, $q_1$, $i_2$, $q_2$, $i_3$, $q_3$, $i_4$, and $q_4$ in order from the high-order bit as illustrated in FIG. 4. That is, in FIG. 4, $i_1$ and $q_1$ are highest in reception quality (most unlikely to be an error), and $i_4$ and $q_4$ are lowest in reception quality (likely to be an error). FIG. 5 illustrates the reception qualities of the streams indicated by the channel information fed back from the radio reception apparatus. That is, as illustrated in FIG. 5, the reception quality of stream #1 is highest, and the reception quality of stream #4 is lowest.

As illustrated in FIG. 4, stream generation section 112 of radio relay apparatus 100 arranges and $q_1$, which are most significant bits (first and second bits from the highest position) among 8 bits configuring each symbol, in stream #1 having the highest reception quality in FIG. 5. Similarly, stream generation section 112 arranges $i_2$ and $q_2$, which are bits next to most significant bits (third and fourth bits from the highest position) among the 8 bits configuring each symbol, in stream #2 having the second highest reception quality in FIG. 5. Further, stream generation section 112 arranges $i_4$ and $q_4$, which are least significant bits (seventh and eighth bits from the highest position) among the 8 bits configuring each symbol, in stream #4 having the lowest reception quality in FIG. 5. In a similar manner, bits are arranged in stream #3.

Thus, in radio relay apparatus 100, among 8 bits ($i_1$, $q_1$ to $i_4$, $q_4$) configuring each symbol obtained by demodulating the data signal transmitted from the radio transmission apparatus, bits $i_1$ and $q_1$ are transmitted through stream #1, bits $i_2$ and $q_2$ are transmitted through stream #2, bits $i_3$ and $q_3$ are transmitted through stream #3, and bits $i_4$ and $q_4$ are transmitted through stream #4.

As described above, radio relay apparatus 100 arranges a higher-order bit, among a plurality of bits ("$N_{relay} \times 2$" bits) configuring each symbol of the data signal modulated by the M-ary modulation number ($N_{relay} \times 2$, which is herein 8 (256 QAM)), in a stream having a better reception quality among a plurality of multiplexable streams ($N_{relay}$ streams). That is, radio relay apparatus 100 arranges a lower-order bit, among a plurality of bits ("$N_{relay} \times 2$" bits) configuring each symbol of the data signal modulated by the M-ary modulation number ($N_{relay} \times 2$, which is herein 8 (256 QAM)), in a stream having a worse reception quality among a plurality of multiplexable streams ($N_{relay}$ streams).

By this means, the radio reception apparatus receives the high-order bits, which are bits that are unlikely to be an error in the data signal transmitted from the radio transmission apparatus, through the stream having the good reception quality, and the low-order bits, which are bits that are likely to be an error in the data signal transmitted from the radio transmission apparatus, through the stream having the bad reception quality. For this reason, the radio reception apparatus can improve the error rate characteristic of the high-order bits (bits that are unlikely to be an error) further than the error rate characteristics of the low-order bits (bits that are likely to be an error). That is, in the radio reception apparatus, the difference in the error rate characteristics between a plurality of bits configuring each symbol of the data signal transmitted from the radio transmission apparatus further increases.

By this means, for example, it is desirable for radio relay apparatus 100 to arrange information, which has to be transmitted without an error, such as a retransmission bit or control information in stream #1 illustrated in FIG. 4 (the stream having the good reception quality), and to arrange information, whose error has less influence on a system, such as parity information or padding bit, in stream #4 illustrated in FIG. 4 (the stream having the bad reception quality). By this means, information bits (high-order bits) transmitted through the stream having the good reception quality can have the improved error rate characteristics, and thus the system capacity can be improved.

Figure 6:
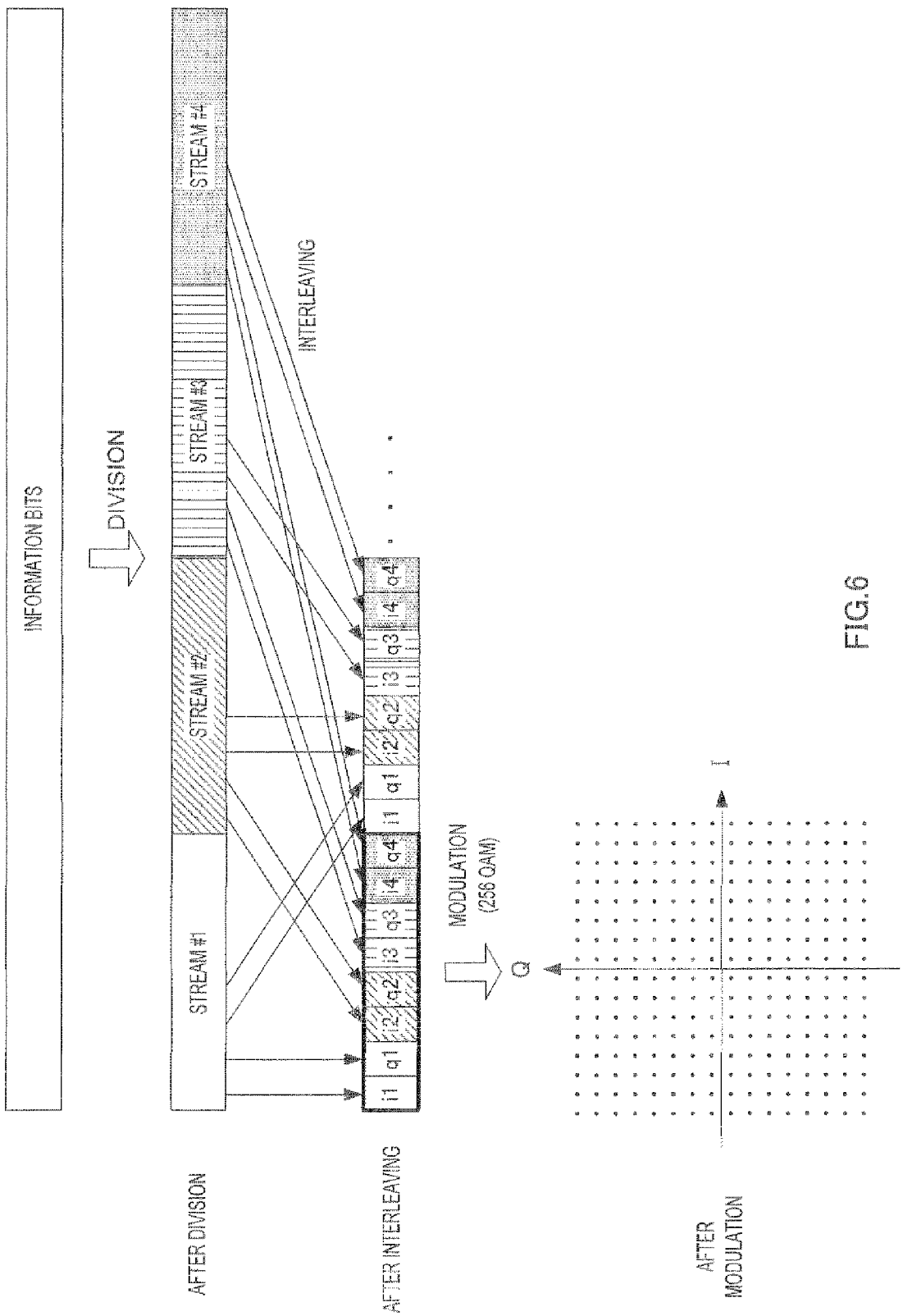
FIG. 6 is a diagram illustrating a transmission process of a data signal in a radio transmission apparatus according to Embodiment 3 of the present invention.

In addition, for example, radio relay apparatus 100 may notify the radio transmission apparatus of the quality (CQI) between the radio relay apparatus 100 and the radio transmission apparatus, and the radio transmission apparatus may decide the modulation scheme (the M-ary modulation number) and the number of streams based on the CQI notified from radio relay apparatus 100. For example, the radio transmission apparatus decides the 256 QAM scheme (the M-ary modulation number: 8 (=$N_{relay} \times 2$)) and 4 as the number of streams (=$N_{relay}$) based on the CQI from radio relay apparatus 100 as illustrated in FIG. 6. Then, the radio transmission apparatus divides the data signal (information bits) in accordance with 4 (=$N_{relay}$) streams #1 to #4 as illustrated in FIG. 6. Then, the radio transmission apparatus interleaves the information bits respectively corresponding to streams #1 to #4 as illustrated in FIG. 6. Specifically, the radio transmission apparatus sets first and second bits $i_1$ and $q_1$ from the highest position among a plurality of bits configuring each symbol as information bits corresponding to stream #1, and sets third and fourth bits $i_2$ and $q_2$ from the highest position among a plurality of bits configuring each symbol as information bits corresponding to stream #2. In a similar manner, the remaining bits are set as information bits corresponding to streams #3 and #4. That is, the radio transmission apparatus interleaves information bits in view of the 4 streams to be multiplexed between radio relay apparatus 100 and the radio reception apparatus.

In FIG. 6, for example, preferably, retransmission bits, control information, or the like are assigned as information bits corresponding to stream #1 (information bits arranged in the most significant bits $i_1$ and $q_1$ of each symbol), and parity bits, padding bits, or the like are assigned as information bits corresponding to stream #4 (information bits arranged in the least significant bits $i_4$ and $q_4$ of each symbol).

Then, the radio transmission apparatus generates the data signal including 8 bits $i_1$, $q_1$, $i_2$, $q_2$, $i_3$, $q_3$, $i_4$, and $q_4$ per symbol by modulating the interleaved information bits by the 256 QAM scheme as illustrated in FIG. 6. By this means, radio relay apparatus 100 transmit the most significant bits $i_1$ and $q_1$ of each symbol through stream #1 having the highest reception quality, and transmit the least significant bits $i_4$ and $q_4$ of each symbol through stream #4 having the lowest reception quality, as illustrated in FIG. 4 above.

Thus, according to the present embodiment, the radio relay apparatus arranges bits configuring each symbol of the data signal transmitted from the radio transmission apparatus in the respective stream according to the reception qualities of the streams. That is, the radio relay apparatus transmits the higher-order bits (bits that are unlikely to be an error), among a plurality of bits configuring each symbol of the data signal transmitted from the radio transmission apparatus, through the stream having the better reception quality, and transmits the lower-order bits (bits that are likely to be an error) through the stream having the worse reception quality. By this means, the radio relay apparatus can reduce an error in the stream having the better reception quality. As described above, according to the present embodiment, it is possible to obtain the same effect as Embodiment 1, and improve the system capacity by appropriately adjusting the error rate characteristics between a plurality of bits configuring each symbol of the transmitted data signal.

The present embodiment has been described in connection with the case in which the channel information representing the reception quality of each stream is fed back from the radio reception apparatus. However, in the present invention, for example, the radio reception apparatus may give a priority order of streams in a descending order of the reception quality based on the reception quality of each stream and feed back information representing the priority order (for example, a priority order number) to the radio relay apparatus. The radio relay apparatus transmits bits that are unlikely to be an error (high-order bits) through a stream having a high priority order (a stream having a high reception quality) according to the priority order of the streams fed back from the radio reception apparatus, and transmits bits that are likely to be an error (low-order bits) through a stream having a low priority order (a stream having a low reception quality).

The present embodiment has been described in connection with the example in which the radio relay apparatus arranges the higher-order bits, among a plurality of bits ("$N_{relay} \times 2$" bits) configuring each symbol of the data signal modulated by the M-ary modulation number of "$N_{relay} \times 2$", in the stream having the higher reception quality among the $N_{relay}$ streams.

However, in the present invention, the radio relay apparatus may arrange the lower-order bits, among a plurality of bits ("$N_{relay} \times 2$" bits) configuring each symbol of the data signal modulated by the M-ary modulation number of "$N_{relay} \times 2$", in the stream having the higher reception quality among the $N_{relay}$ streams. By this means, it is possible to average the error rate characteristics of all bits transmitted by one symbol. The system of averaging the error rate characteristics of all bits transmitted by one symbol is particularly effective in the case in which a common error correction code (ECC) (which is called a "single codeword" when a common error correction code is used in all of streams) is applied over a plurality of streams. This is because, in error correction decoding, as a variation in the likelihood between a reception symbol and a reception bit decreases, error correction decoding is properly performed, so that the error rate characteristics are improved, the throughput is improved, and the capacity increases.

Embodiment 4

The present embodiment will be described in connection with an example in which the number of multipath channels generated between the radio relay apparatus and the radio reception apparatus (that is, the number of multipath channels detected by the radio reception apparatus) is smaller than the number $N_{relay}$ of antennas of the radio relay apparatus.

A concrete description will be made below. In the following description, the number of antennas of radio relay apparatus 100 (FIG. 1) according to the present embodiment is four (4) ($N_{relay}$=4), similarly to Embodiment 3. Thus, the radio transmission apparatus transmits the data signal modulated by the 256 QAM scheme (the M-ary modulation number: $N_{relay} \times 2$, that is, 8 bits per symbol) to radio relay apparatus 100. Further, the radio transmission apparatus divides the information bits in accordance with the $N_{relay}$ streams, and interleaves the divided information bits, in the same manner as in FIG. 6 described in Embodiment 3. Then, the radio transmission apparatus obtains the data signal (8 bits configuring each symbol are represented by $i_1$, $q_1$, $i_2$, $q_2$, $i_3$, $q_3$, $i_4$, and $q_4$ in order from the high-order bit) by modulating the interleaved information bits by the 256 QAM scheme.

Further, the number L of multipath channels detected by the radio reception apparatus is two (2). That is, the radio reception apparatus transmits control information including the number L (=2) of multipath channels and the number $N_{rx}$ (=1) of antennas to radio relay apparatus 100.

Figure 7:
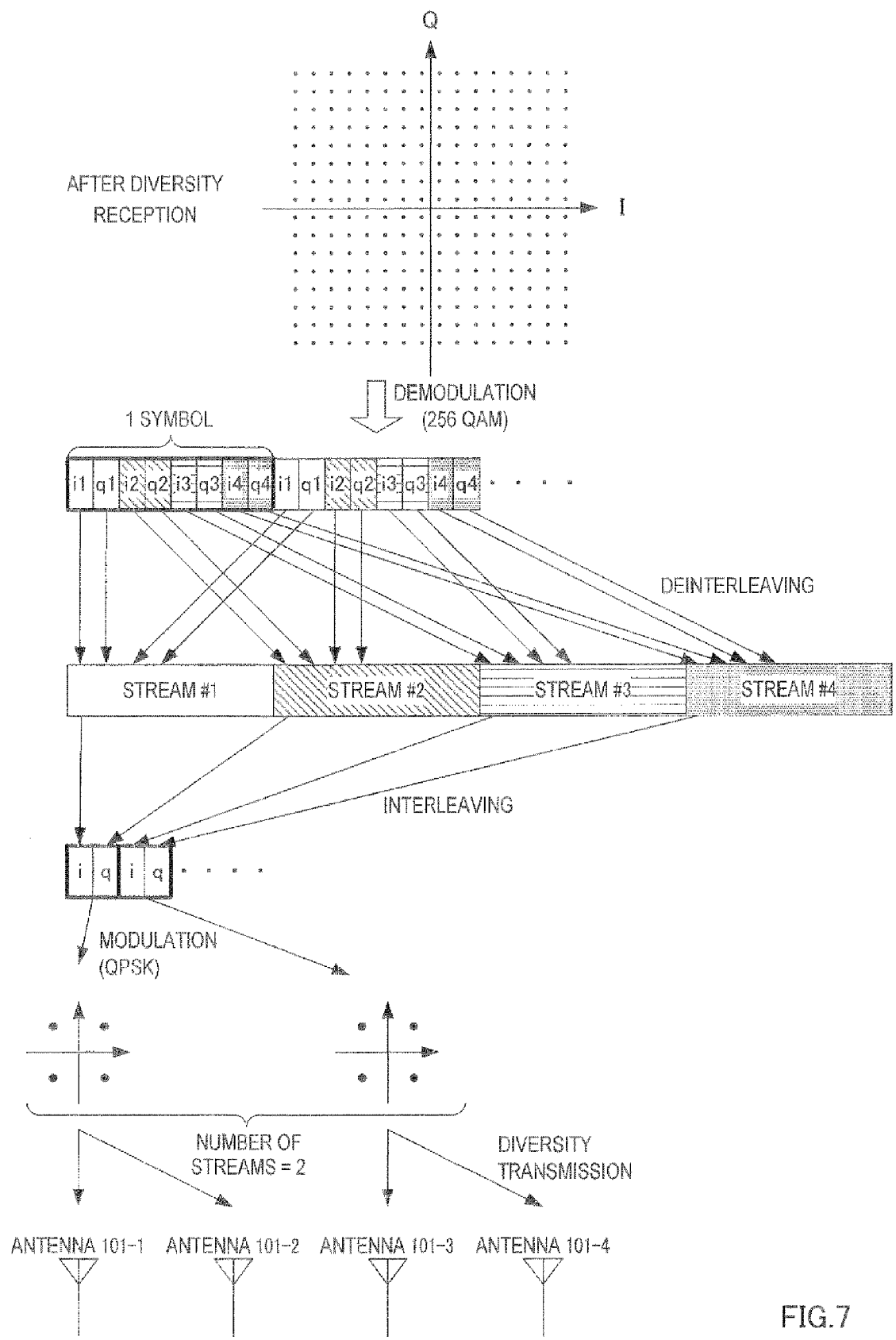
FIG. 7 is a diagram illustrating a relay process of a radio relay apparatus according to Embodiment 4 of the present invention.

Demodulation section 108 of radio relay apparatus 100 obtains data bits ($i_1$, $q_1$, $i_2$, $q_2$, $i_3$, $q_3$, $i_4$, and $q_4$), which configure each symbol illustrated in FIG. 7) by demodulating the data signal input from diversity reception section 106.

Stream number decision section 111 decides 2 (=min(4, 2×1)) as the number of multiplexable streams according to equation 2 using the number $N_{relay}$ of transmission antennas of the radio relay apparatus 100, and the number L of multipath channels and the number $N_{rx}$ of reception antennas, which are included in the control information transmitted from the radio reception apparatus. That is, the number of streams multiplexable between radio relay apparatus 100 and the radio reception apparatus is smaller than the number $N_{relay}$ of antennas of radio relay apparatus 100.

Stream generation section 112 deinterleaves the data bits demodulated by demodulation section 108 in the same manner as interleaving in the radio transmission apparatus, and generates 4 streams #1 to #4, as illustrated in FIG. 7. Specifically, stream generation section 112 arranges the most significant bits $i_1$ and $q_1$, among the data bits of 8 bits configuring each symbol of the data signal, in stream #1, as illustrated in FIG. 7. In the same manner, stream generation section 112 arranges bits $i_2$ and $q_2$, which are the next most significant bits, among the data bits of 8 bits configuring each symbol of the data signal, in stream #2. In the same manner, the remaining bits are arranged in streams #3 and #4.

However, since the number of streams input from stream number decision section 111 is two (2) (which is smaller than the number $N_{relay}$ (=4) of antennas arranged in the radio relay apparatus 100), stream generation section 112 inputs streams #1 and #2 among streams #1 to #4 illustrated in FIG. 7 to either of modulation sections 114-1 and 114-2. Further, stream generation section 112 inputs streams #3 and #4 among streams #$_1$ to #4 illustrated in FIG. 7 to either of modulation sections 114-3 and 114-4. That is, when the number of streams (here, 2 streams) multiplexable between the radio relay apparatus 100 and the radio reception apparatus is smaller than the number $N_{relay}$ of antennas, stream generation section 112 consolidates the generated N streams into streams which are equal in number to the number of multiplexable streams.

Then, either modulation section 114-1 or modulation section 114-2 modulates streams #1 and #2 by the QPSK scheme by arranging the data bits configuring stream #1 in bit i of 2 bits (i and q) configuring a QPSK symbol, and arranging the data bits configuring stream #2 in bit q of the 2 bits (i and q) configuring the QPSK symbol, as illustrated in FIG. 7. Similarly, either modulation section 114-3 or modulation section 114-4 modulates streams #3 and #4 by the QPSK scheme by arranging the data bits configuring stream #3 in bit i of 2 bits (i and q) configuring a QPSK symbol, and arranging the data bits configuring stream #4 in bit q of the 2 bits (i and q) configuring the QPSK symbol, as illustrated in FIG. 7. That is, modulation sections 114-1 to 114-4 modulate the streams, which are input from stream generation section 112 and are equal in number to the number of multiplexable streams (here, 2 streams), by the QPSK scheme.

By this means, a QPSK symbol including information of streams #1 and #2 and a QPSK symbol including information of streams #3 and #4 are obtained as illustrated in FIG. 7. That is, obtained is stream data (QPSK symbols) which corresponds in number to the number of streams (2 streams) multiplexable between radio relay apparatus 100 and the radio reception apparatus as illustrated in FIG. 7.

Then, as illustrated in FIG. 7, radio relay apparatus 100 performs diversity-transmissions on the QPSK symbol including information of streams #1 and #2 using antennas 101-1 and 101-2, and diversity-transmits the QPSK symbol including information of streams #3 and #4 using antennas 101-3 and 101-4.

As described above, similarly to Embodiment 1, radio relay apparatus 100 divides the data signal transmitted from the radio transmission apparatus, and generates $N_{relay}$ streams #1 to #4 which are equal in number to the number $N_{relay}$ of antennas of the radio relay apparatus 100. However, when the number of streams multiplexable between radio relay apparatus 100 and the radio reception apparatus is smaller than the number $N_{relay}$ of antennas of radio relay apparatus 100, even though radio relay apparatus 100 spatially multiplexes the $N_{relay}$ streams and transmits the spatially multiplexed streams, the radio reception apparatus cannot demultiplex the $N_{relay}$ streams. In this case, when the number of streams multiplexable between radio relay apparatus 100 and the radio reception apparatus is smaller than the number $N_{relay}$ of antennas of radio relay apparatus 100, radio relay apparatus 100 according to the present embodiment generates the streams by the number of actually multiplexable streams by consolidating a plurality of generated streams into one stream. For example, in FIG. 7, radio relay apparatus 100 generates the two streams which are actually multiplexable by consolidating the two streams of streams #1 and #2 and the two streams of streams #3 and #4, respectively. That is, radio relay apparatus 100 reduces the number of streams up to the number of multiplexable streams (the number of streams which can be demultiplexed by the radio reception apparatus). By this means, the radio reception apparatus can reliably receive a plurality of streams (the two streams in FIG. 7) transmitted by radio relay apparatus 100.

When the number of multiplexable streams is smaller than the number $N_{relay}$ of antennas of radio relay apparatuses 100, radio relay apparatus 100 may use surplus antennas (in FIG. 7, the difference between the number $N_{relay}$ of antennas (=4) and the number of multiplexable streams (=2), that is, two antennas) for transmission diversity. Thus, when the number of multiplexable streams is smaller than the number $N_{relay}$ of antennas of radio relay apparatuses 100, the number of multiplexed streams is reduced, however, the streams are transmitted through diversity-transmission. Thus, in the radio reception apparatus, it is possible to improve the error rate characteristic of each stream and increase the system capacity, similarly to Embodiment 1.

As the transmission diversity technique, for example, a cyclic delay diversity (CDD) technique or a space time coding (STC) diversity technique may be used. Particularly, according to the cyclic delay diversity technique, since it is possible to increase the number of multipath channels received by the radio reception apparatus, the radio reception apparatus can increase the number of multiplexable streams by increasing the number of multipath channels.

Further, as illustrated in FIG. 7, radio relay apparatus 100 consolidates streams #1 and #2 and modulates the consolidated stream by the QPSK scheme, and consolidates streams #3 and #4 and modulates the consolidated stream by the QPSK scheme. That is, as illustrated in FIG. 7, the two streams which are spatially multiplexed and transmitted by radio relay apparatus 100 include information bits of streams #1 to #4. That is, radio relay apparatus 100 can equally transmit the information bits of the generated streams even when the number of actually multiplexed streams is reduced by consolidating a plurality of generated streams. By this means, it is possible to prevent a delay occurring when some of streams are first transmitted, and the remaining streams are transmitted later.

Thus, according to the present embodiment, even when the number of multiplexable streams is smaller than the number $N_{relay}$ of antennas of radio relay apparatus 100, the radio reception apparatus can reliably demultiplex the streams and increase the system capacity, similarly to Embodiment 1.

The present embodiment has been described in connection with the example in which the number of multiplexable streams is smaller than the number of antennas of the radio relay apparatus. However, in the present invention, for example, even when the number of multiplexable streams is equal to the number of antennas of the radio relay apparatus, if it is determined that the reception quality of the radio reception apparatus does not reach a desired level, the radio relay apparatus may reduce the stream multiplication number, in the same manner as in the present embodiment. By this means, similarly to the present embodiment, since the transmission diversity technique can be used in the radio relay apparatus, the radio reception apparatus can receive the streams at the desired reception quality.

Further, the present embodiment has been described in connection with the example in which the antennas of the radio relay apparatus are used as the transceiving antennas, that is, the example in which the number of transmission antennas of the radio relay apparatus is equal to the number of reception antennas. However, in the present invention, the number of transmission antennas of the radio relay apparatus may be different from the number of reception antennas.

The exemplary embodiments of the present invention have been described hereinbefore.

The above embodiments have been described in connection with the example in which the number of transmission antennas of the radio transmission apparatus is one, and the number of reception antennas of the radio reception apparatus is one. However, in the present invention, the number of transmission antennas of the radio transmission apparatus and the number of reception antennas of the radio reception apparatus are not limited to one but may be two or more. Regardless of the number of transmission antennas of the radio transmission apparatus, the radio relay apparatus can detect the number of streams which the radio transmission apparatus has transmitted using the M-ary modulation, demultiplex the detected streams, modulate the demultiplexed streams using the QPSK scheme, and transmit the modulated streams to the radio reception apparatus. Even in this case, similarly to the above embodiments, by increasing the number of antennas of the radio relay apparatus without increasing the number of antennas in both of the radio transmission apparatus and the radio reception apparatus, it is possible to improve the data transmission rates of the radio transmission apparatus and the radio reception apparatus.

Further, the above embodiments have been described in connection with the example in which the QPSK is used as the communication scheme between the radio relay apparatus and the radio reception apparatus. In the above embodiments, the reason for using the QPSK is because the QPSK is the modulation scheme which is excellent in the error rate characteristics with respect to Eb/No. Thus, in the present invention, a binary phase shift keying (BPSK) scheme having the same error rate characteristics with respect to Eb/No as the QPSK may be used as the communication scheme between the radio relay apparatus and the radio reception apparatus. Even in this case, similarly to the above embodiments, by increasing the number of antennas of the radio relay apparatus without increasing the number of antennas in both of the radio transmission apparatus and the radio reception apparatus, it is possible to improve the data transmission rates of the radio transmission apparatus and the radio reception apparatus. In addition, the BPSK and the QPSK may be used in combination between a plurality of antennas.

Further, the above embodiments have been described in connection with the example in which the radio transmission apparatus transmits data to the radio relay apparatus using the QAM scheme (the 256 QAM in the above embodiments). However, in the present embodiment, any scheme capable of transmitting a plurality of bits using one symbol without increasing the transmission bandwidth may be used as the communication scheme for data transmission from the radio transmission apparatus to the radio relay apparatus. For example, in the present invention, phase shift keying (PSK), frequency shift keying (FSK), amplitude shift keying (ASK), or the like may be used as the communication scheme for data transmission from the radio transmission apparatus to the radio relay apparatus. Further, a modulation scheme in which the above schemes are combined may be used.

Further, the above embodiments have been described in connection with the example in which the radio transmission apparatus modulates the signal by the M-ary modulation number of "$N_{relay} \times 2$". However, in the present embodiment, the radio transmission apparatus may modulate the signal by the M-ary modulation number of M (Here, M≤$N_{relay}$×2). For example, the radio transmission apparatus may change the M-ary modulation number M according to the channel quality between the radio transmission apparatus and the radio relay apparatus. At this time, the radio transmission apparatus may measure the radio propagation environment between the radio transmission apparatus and the radio relay apparatus with reference to the CQI notified from the radio relay apparatus, and then change the M-ary modulation number M. Alternatively, the radio transmission apparatus may measure the radio propagation environment by measuring the distance between the radio transmission apparatus and the radio relay apparatus, and then change the M-ary modulation number M. Further, the radio transmission apparatus may decide the M-ary modulation number M, which is used for the signal to be transmitted from the radio transmission apparatus to the radio relay apparatus, with reference to the CQI. Alternatively, the radio relay apparatus may notify the radio transmission apparatus of the M-ary modulation number M, and the radio transmission apparatus may use the notified M-ary modulation number M.

Figure 8:
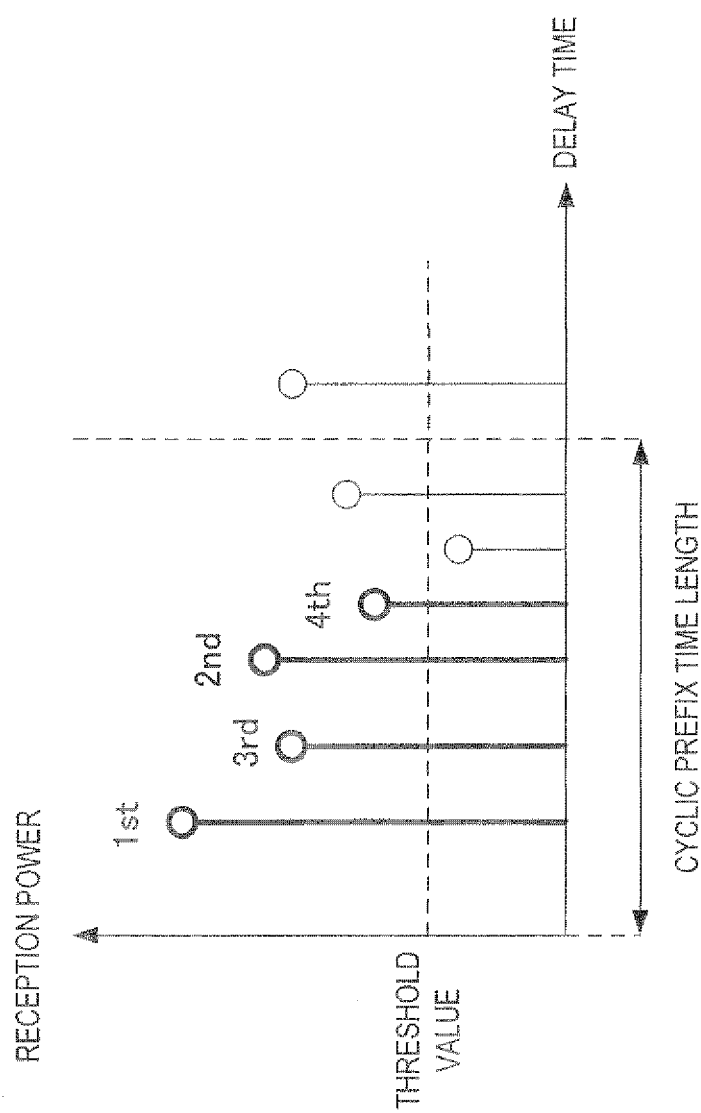
FIG. 8 is a diagram illustrating a generation process of multipath information according to the present invention.

In the above embodiment, the multipath information notified from the radio reception apparatus to the radio relay apparatus is configured, for example, with the number of multipath channels, power of each path, timing of each path, or the like. In the present invention, the multipath information may be notified only for a path whose reception power is equal to or more than a predetermine threshold value or a predetermined number of path in a descending order of reception power. Further, the multipath information may be notified only for a path whose delay time is equal to or less than a predetermined value, for example, a path whose delay time is within a cyclic prefix (CP) or a guard interval (GI). Further, since the radio relay apparatus cannot multiplex the number of streams larger than the number of antennas of the radio relay apparatus, the radio relay apparatus may notify the radio reception apparatus of the number of antennas of the radio relay apparatus, and the radio reception apparatus may notify the radio relay apparatus of multipath information related to paths which are equal in number to the notified number of antennas. As a result, the radio relay apparatus can receive only minimum multipath information necessary for performing multipath multiplexing transmission between the radio relay apparatus and the radio reception apparatus. For example, as illustrated in FIG. 8, the radio reception apparatus first selects 6 paths which are within a cyclic prefix time length among detected multipath channels. Next, 5 paths whose reception power reaches a threshold value or more are selected from among the 6 paths. Next, paths (1st to 4th illustrated in FIG. 8) which are equal in number to the number of antennas of the radio relay apparatus (4 in FIG. 8) are selected from the paths. As described above, by transmitting the multipath information related to the 4 paths (1st to 4th) illustrated in FIG. 8, the radio reception apparatus may omit notification of the multipath channels which are hardly detected by the radio reception apparatus. Further, the radio relay apparatus can perform multipath multiplexing transmission using the multipath having the good quality. That is, the radio relay apparatus can prevent the use of the multipath which cannot be detected by the radio reception apparatus. Thus, since the multipath information including only the minimum necessary information is notified to the radio relay apparatus, it is possible to reduce the capacity used for the control channel, and improve the system capacity by the radio relay apparatus using the multipath having the good quality.

Further, for example, in an ad-hoc radio communication system, mobile terminal apparatuses perform communications directly with each other. Thus, by installing the radio relay apparatus according to the present invention at an arbitrary place within the ad-hoc radio communication system, it is possible to improve the transmission rate (capacity) between the mobile terminal apparatuses. That is, according to the present invention, in the ad-hoc radio communication system, it is possible to improve the transmission rate between the mobile terminal apparatuses without significantly changing the system. At this time, since the radio transmission apparatus needs to recognize that transmission by M-ary modulation has been requested from the radio reception apparatus, and the radio reception apparatus needs to recognize that the multipath multiplexed signal has been transmitted from the radio transmission apparatus, the mobile terminal apparatuses (between the radio transmission apparatus and the radio reception apparatus) need not detect a situation in which the radio relay apparatus has been installed. Thus, in the ad-hoc radio communication system, it is possible to arbitrarily install or remove the radio relay apparatus, and thus there is an effect capable of easily designing the placement of the relay apparatus in the system.

Further, in the present invention, an arbitrary reception diversity algorithm such as maximum ratio combining (MRC), minimum mean square error (MMSE), or zero forcing (ZF) may be used for the diversity reception process. Alternatively, when the signal (the M-ary modulated signal) from the radio transmission apparatus has a multipath component, the reception diversity technique such as a time domain equalizer or a frequency domain equalizer may be used.

Further, in the present invention, the radio relay apparatus may be installed to be incorporated in a base station apparatus. Since the base station apparatus is allowed to have a relatively large housing and to perform relatively high power transmission similarly to the radio relay apparatus, it is possible to obtain the same effects as in the above embodiment. For example, it is possible to mount the radio relay apparatus of the present invention in an indoor base station apparatus which is smaller in size than a conventional base station apparatus, or a home base station apparatus (Home-eNode B). When the radio relay apparatus of the present invention is mounted in the home base station apparatus, it is possible to apply the present invention to various home appliances such as a television, a recorder, or an acoustic apparatus.

The above embodiments have been described in connection with the antenna, but the present invention may be similarly applied to an antenna port.

The antenna port refers to a logical antenna configured with one or more physical antennas. That is, the antenna port is not limited to referring to one physical antenna but may refer to an antenna array configured with a plurality of antennas.

For example, in the 3GPP-LTE, the number of physical antennas configuring the antenna port is not defined, and the antenna port is defined as a minimum unit in which the base station can transmit different reference signals.

Further, the antenna port may be defined as a minimum unit for multiplying a weight of a preceding vector.

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-175688, filed on Jul. 28, 2009, including the specification, drawings and abstract, are incorporated herein by reference in its entirety.

INDUSTRIAL APPLICABILITY

The present invention can be applied to a mobile communication system or the like.

REFERENCE SIGNS LIST

100 Radio relay apparatus
101 Antenna
102 RF reception section
103 Channel estimation section
104 CQI generation section
105, 114 Modulation section
106, 109 Diversity reception section
107 M-ary number detection section
108 Demodulation section
110 Control information detection section
111 Stream number decision section
112 Stream generation section
113 Pilot generation section
115 RF transmission section

The invention claimed is:

1. A radio relay apparatus that relays a signal between a radio transmission apparatus and a radio reception apparatus, comprising:
   N antennas ports, N being a natural number of 2 or more;
   a reception section that receives the signal from the radio transmission apparatus via the N antenna ports, the signal being modulated at the radio transmission apparatus using a first M-ary modulation number M, M being a natural number of 1 or more;
   a generation section that divides the signal to generate N streams;
   a modulation section that modulates the N streams using a second M-ary modulation number K, K being a natural number of 1 or more; and
   a transmission section that transmits the modulated N streams to the radio reception apparatus via the N antenna ports,
   wherein the first M-ary modulation number M is decided based on N×K.

2. The radio relay apparatus according to claim 1, wherein K is 2, and the modulation section modulates the N streams with a quadrature phase shift keying (QPSK) scheme.

3. The radio relay apparatus according to claim 1, wherein K is 1, and the modulation section modulates the N streams with a binary phase shift key (BPSK) scheme.

4. The radio relay apparatus according to claim 1, wherein the reception section performs diversity reception on the signal via the N antenna ports using a channel estimation value estimated based on a pilot signal, which is configured with a spreading sequence, transmitted from the radio transmission apparatus.

5. The radio relay apparatus according to claim 1, wherein the transmission section transmits a pilot signal configured with a zero autocorrelation (ZAC) sequence to the radio reception apparatus via the N antenna ports.

6. The radio relay apparatus according to claim 1, wherein the generation section arranges a higher-order bit, among M bits configuring each symbol of the signal modulated using the first M-ary modulation number M, on a stream having a better channel quality among the N streams.

7. The radio relay apparatus according to claim 1, wherein the generation section arranges a lower-order bit, among M bits configuring each symbol of the signal modulated using the first M-ary modulation number M, on a stream having a better channel quality among the N streams.

8. The radio relay apparatus according to claim 1, wherein, when the number of multiplexable streams between the radio relay apparatus and the radio reception apparatus is smaller than N, the generation section consolidates the N streams into streams which are equal in number to the number of the multiplexable streams, and
   the modulation section modulates the streams which are equal in number to the number of multiplexable streams with a quadrature phase shift keying (QPSK) scheme.

9. A radio relay method in a radio relay apparatus that includes N antenna ports, N being a natural number of 2 or more, and relays a signal between a radio transmission apparatus and a radio reception apparatus, comprising:
   receiving the signal from the radio transmission apparatus via the N antenna ports, the signal being modulated at the radio transmission apparatus using a first M-ary modulation number M, M being a natural number of 1 or more;
   dividing the signal to generate N streams;
   modulating the N streams using a second M-ary modulation number K, K being a natural number of 1 or more; and
   transmitting the modulated N streams to the radio reception apparatus via the N antenna ports,
   wherein the first M-ary modulation number M is decided based on N×K.

10. A communication apparatus that performs communication with a second communication apparatus via a relay by a first communication apparatus, comprising:
   a reception section that receives the number of multiplexable streams in a communication path from the first communication apparatus to the second communication apparatus, from the first communication apparatus or the second communication apparatus;
   a modulation section that modulates a signal using an M-ary modulation number decided based on the number of received multiplexable streams; and
   a transmission section that transmits the modulated signal to the first communication apparatus,
   wherein the M-ary modulation number is decided based on L×K×Nr,
   where L represents the number of multipath channels in the communication path, K represents an M-ary modulation number when the first communication apparatus modulates a signal, and Nr represents the number of antenna ports of the second communication apparatus.

11. A communication apparatus that performs communication with a second communication apparatus via a relay by a first communication apparatus, comprising:

a reception section that receives communication quality information in a communication path from the communication apparatus to the first communication apparatus;

a modulation section that modulates a signal using an M-ary modulation number and the number of streams in a communication path from the first communication apparatus to the second communication apparatus, which are decided based on the received communication quality information; and a transmission section that transmits the modulated signal to the first communication apparatus, wherein the M-ary modulation number is decided based on L×K×Nr, and the number of streams is decided based on L×Nr, where L represents the number of multipath channels in the communication path from the first communication apparatus to the second communication apparatus, K represents an M-ary modulation number when the first communication apparatus modulates a signal, and Nr represents the number of antenna ports of the second communication apparatus.

12. The communication apparatus according to claim 1, wherein the first M-ary modulation number M, the second M-ary modulation number K and N satisfy the following formula:

$$M \leq N \times K.$$

13. A radio relay apparatus that relays a signal between a radio transmission apparatus and a radio reception apparatus, comprising:

N antennas ports, N being a natural number of 2 or more;

a reception section that receives the signal from the radio transmission apparatus via the N antenna ports, the signal being modulated at the radio transmission apparatus using a first M-ary modulation number M, M being a natural number of 1 or more;

a generation section that divides the signal to generate N streams;

a modulation section that modulates the N streams using a second M-ary modulation number K, K being a natural number of 1 or more; and a transmission section that transmits the modulated N streams to the radio reception apparatus via the N antenna ports, wherein the first M-ary modulation number M is decided based on L×K×Nr, where L represents the number of multipath channels in the communication path from the radio relay apparatus to the radio reception apparatus, and Nr represents the number of antenna ports of the radio reception apparatus.

* * * * *